United States Patent [19]

Melnytschuk

[11] Patent Number: 5,621,253
[45] Date of Patent: Apr. 15, 1997

[54] AUTOMOBILE SAFETY DEVICE

[76] Inventor: Alice M. Melnytschuk, 37565 N. Alpine La., Lake Villa, Ill. 60046

[21] Appl. No.: 597,550

[22] Filed: Feb. 2, 1996

[51] Int. Cl.$^6$ ................................. B60L 1/14; B60Q 1/04
[52] U.S. Cl. .............................. 307/10.8; 315/77; 315/82; 315/83; 361/195
[58] Field of Search ..................... 219/202, 203, 219/522; 307/9.1, 10.1, 10.8, 141, 141.4; 315/77, 82, 83; 361/160, 170, 189, 195, 600

[56] References Cited

U.S. PATENT DOCUMENTS

| | | | |
|---|---|---|---|
| 3,591,845 | 7/1971 | Vanderpoel | 307/10.8 |
| 3,600,596 | 8/1971 | Aloisantoni | 307/10.8 |
| 4,097,839 | 6/1978 | Lesiak | 315/82 |
| 4,194,175 | 3/1980 | Eklund | 315/82 |
| 4,236,099 | 11/1980 | Rosenblum | 315/83 |
| 4,337,400 | 6/1982 | Hahn | 315/82 |
| 5,027,001 | 6/1991 | Torbert | 307/10.1 |
| 5,168,196 | 12/1992 | Briggette, Sr. et al. | 315/82 |
| 5,170,097 | 12/1992 | Montemurro | 315/83 |
| 5,202,581 | 4/1993 | Moore | 307/10.8 |
| 5,235,250 | 8/1993 | Cronk | 315/82 |
| 5,374,852 | 12/1994 | Parkes | 307/10.8 |
| 5,424,585 | 6/1995 | Geraghty | 307/10.8 |
| 5,449,974 | 9/1995 | Dunbar | 315/82 |
| 5,523,630 | 6/1996 | Smelley | 307/10.8 |

Primary Examiner—William M. Shoop, Jr.
Assistant Examiner—Peter Ganjoo
Attorney, Agent, or Firm—Joseph N. Breaux

[57] ABSTRACT

An automobile safety device that includes an input wireable to the windshield wiper motor that automatically independently activates each headlight and the rear window defogger.

2 Claims, 2 Drawing Sheets 5,621,253

AUTOMOBILE SAFETY DEVICE

TECHNICAL FIELD

The present invention relates to safety devices that are used in an automobile and more particularly to a safety device that is used in an automobile to sense operation of the automobile wind shield wipers and to automatically activate the automobile headlights and rear window defogger.

BACKGROUND ART

Driving in dark, rainy weather can be dangerous. In addition to the reduced visibility caused by rain striking the windshield, the high humidity can cause the windows in the vehicle to rapidly become fogged. In combination, these visual hindrances lead to the inability of the driver to see other automobiles and often results in an accident. It would be a benefit, therefore, to have a device that automatically activated the rear window defogger when rainy conditions are present. In addition, in order to increase the visibility of the automobile in rainy conditions it would also be a benefit to have a device that sensed rainy conditions and automatically activated the automobiles headlight system. It would of course be a benefit to have a device that could accomplish both of these tasks simultaneously.

GENERAL SUMMARY DISCUSSION OF INVENTION

It is thus an object of the invention to provide an automobile safety device that automatically activates the rear window defogger when rainy conditions are present.

It is a further object of the invention to provide an automobile safety device that sensed rainy conditions and automatically activated the automobiles headlight system.

It is a further object of the invention to provide an automobile safety device that accomplished both of the above objects in combination.

Accordingly, an automobile safety device is provided. The automobile safety device comprises a housing forming an internal circuit chamber and having a first outer surface including a section of adhesive foam secured thereover, the adhesive foam having a peel away cover member thereover in a manner to allow removal of the peel away cover member and securement of the housing to a substantially flat surface with the adhesive foam; a relay switch, disposed within the circuit chamber of the housing, having a first, second and third pair of normally open electrical contacts actuated by a first coil having a coil input connection and a coil output connection, each pair of electrical contacts having a supply side connection and a device side connection, the first coil being activated by a time delay circuit, the time delay circuit having an active output wired to the coil input connection that provides an electrical current to the first coil for a predetermined period of time after detection of an absence of an activation signal at an activation input thereof; a wiring harness including an electrical connector having a left headlight connection member, a right headlight connection member, a defogger connection member, a twelve volt supply connection member, a wiper motor supply connection member, and a ground connection member, each connection member being wired, respectively, to a first end of a left headlight insulated conductor wire, a first end of a right headlight insulated conductor wire, a first end of a defogger insulated conductor wire, a first end of a twelve volt supply insulated conductor wire, a first end of a wiper motor supply insulated conductor wire, and a first end of a ground insulated conductor wire; a second end of the left headlight insulated conductor wire is wired to the device side connection of the first pair of electrical contacts, a second end of the right headlight insulated conductor wire is wired to the device side connection of the second pair of electrical contacts, a second end of the defogger insulated conductor wire is wired to the device side connection of the third pair of electrical contacts, a second end of the twelve volt supply insulated conductor wire is wired to the supply side connection of the first, second and third pairs of electrical contacts, a second end of the wiper motor supply insulated conductor wire is wired to the activation input of the time delay circuit, and a second end of the ground insulated conductor wire is wired to the coil output connection. In a preferred embodiment, the safety device has an on/off switch and the time delay circuit further includes an indicator lamp that extends outwardly from the housing and that is wired into the time delay circuit in a manner such that the indicator lamp is illuminated when the safety device is on.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
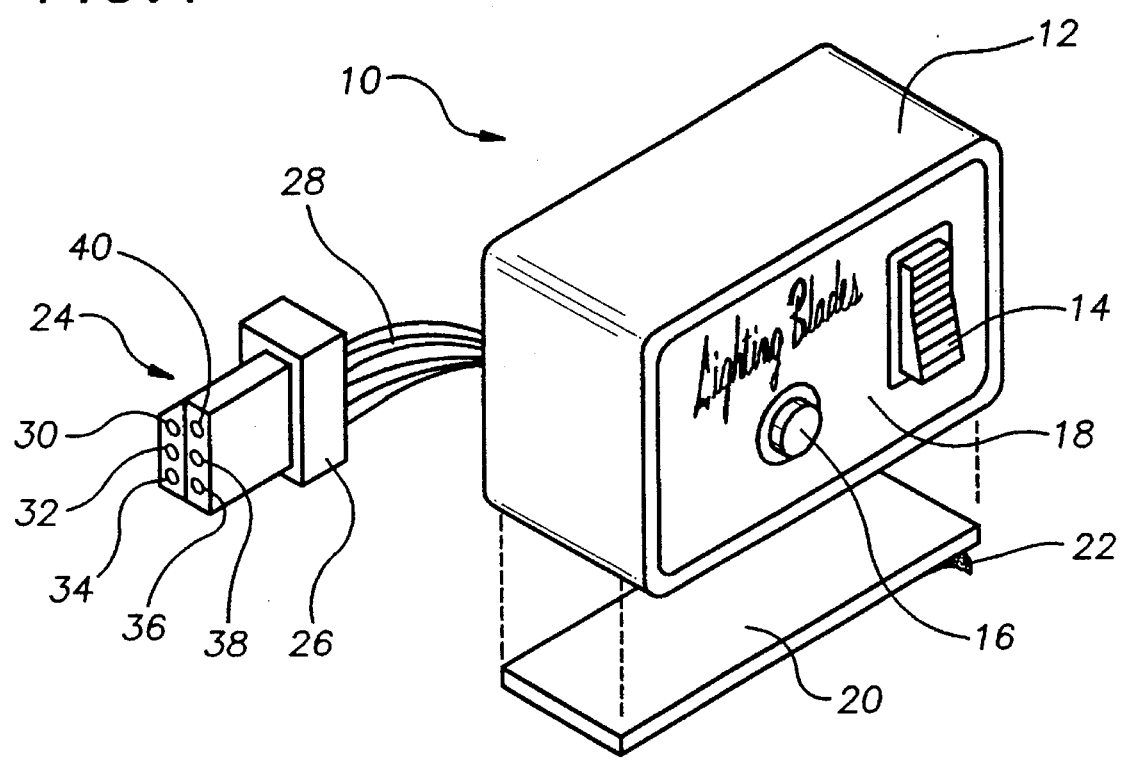
FIG. 1 is a perspective view of an exemplary embodiment of the safety device of the present invention showing the housing and the adhesive foam section.

FIG. 1 shows an exemplary embodiment of the safety device of the present invention generally designated by the numeral 10. Safety device 10 includes a housing 12 having an on/off switch 14 and an on/off indicator lamp t6 extending out through a front panel 18 thereof. A section 20 of adhesive foam material is shown exploded away from a bottom surface of housing 12. Section 20 includes a peel away cover member 22 that is shown partially peeled away from section 20. A wiring harness, generally designated by the numeral 24, extends out of housing 12 and includes an electrical connector 26 and a wiring cable 28. Electrical connector 26 includes a left headlight connection jack 30, a right headlight connection jack 32, a defogger connection jack 34, a twelve volt supply connection jack 36, a wiper motor supply connection jack 38, and a ground connection jack 40. Wiring cable 28 has six conductors: a left headlight insulated conductor wire, a right headlight insulated conductor wire, a defogger insulated conductor wire, a twelve volt supply insulated conductor wire, a wiper motor supply insulated conductor wire, and a ground insulated conductor wire.

Figure 2:
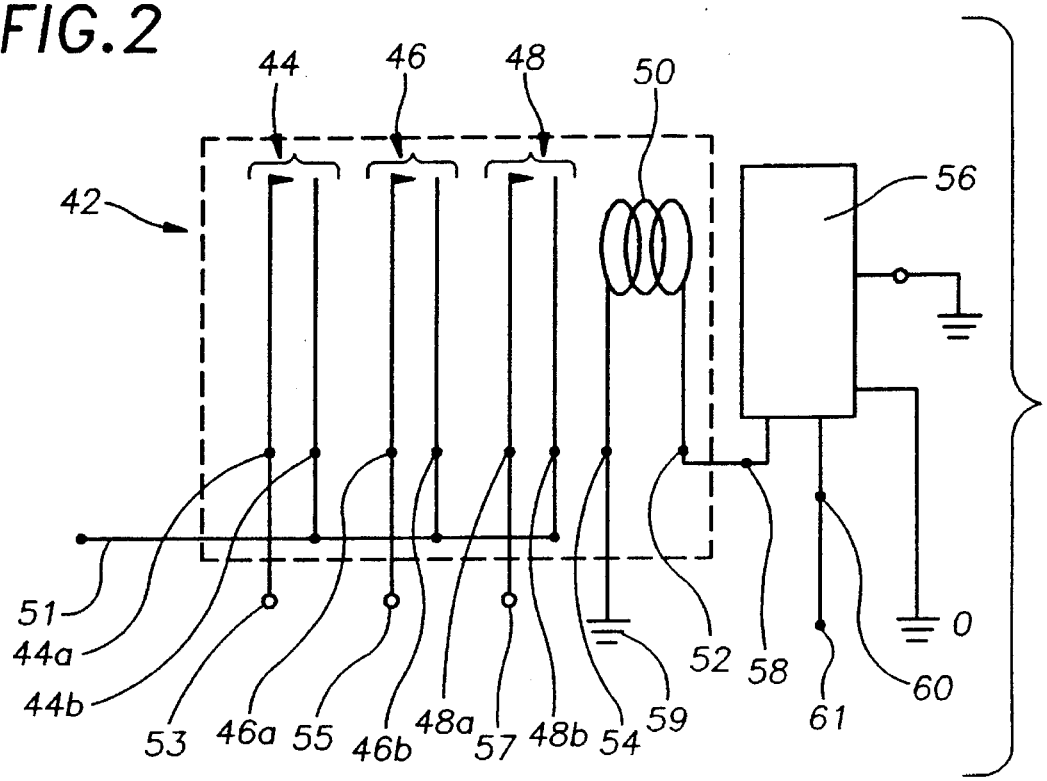
FIG. 2 is a schematic view of the relay and time delay circuit of the safety device of FIG. 1.

FIG. 2 is a schematic representation showing a relay switch, generally designated by the numeral 42 that is disposed within a circuit chamber 13 (shown in FIG. 1) that is formed within housing 12. Relay switch 42 includes a first, second and third pair of normally open electrical contacts 44, 46, 48. First, second and third contact pairs 44, 46, 48 are all simultaneously closed when a first coil 50 is active. First coil 50 includes a coil input connection 52 and a coil output connection 54. First coil 50 is activated by a time delay circuit 56. Time delay circuit 56 has an active output 58 wired to coil input connection 52. Time delay circuit 56 also includes an activation input 60.

Each contact pair 44, 46, 48 includes a supply side connection 44a, 46a, 48a, and a device side connection 44b, 46b, 48b. All three supply side connections 44a, 46a, 48a are wired to the twelve volt supply insulated conductor wire 51 of wiring cable 28. Device side contact 44b is wired to left headlight insulated conductor wire 53. Device side contact 46b is wired to right headlight insulated conductor wire 55. Device side contact 48b is wired to defogger insulated conductor wire 57. coil output connection 54 is wired to ground insulated conductor wire 59. Activation input 60 of the time delay circuit 56 is wired to wiper motor supply insulated conductor wire 61.

Application of a high voltage (+12 Volts) to activation input 60 causes time delay circuit 56 to place twelve volts onto output 58. Output 58 remains high (+12 Volts) for a period of forty-five (45) seconds beyond the time when the voltage at activation input 60 drops down to the ground voltage level. If a high voltage level is again placed on activation input 60 prior to the expiration of the forty-five (45) second delay, the time delay circuit is reset and the forty-five (45) second delay does resume until a ground voltage is placed on activation input 60 once again.

Figure 3:
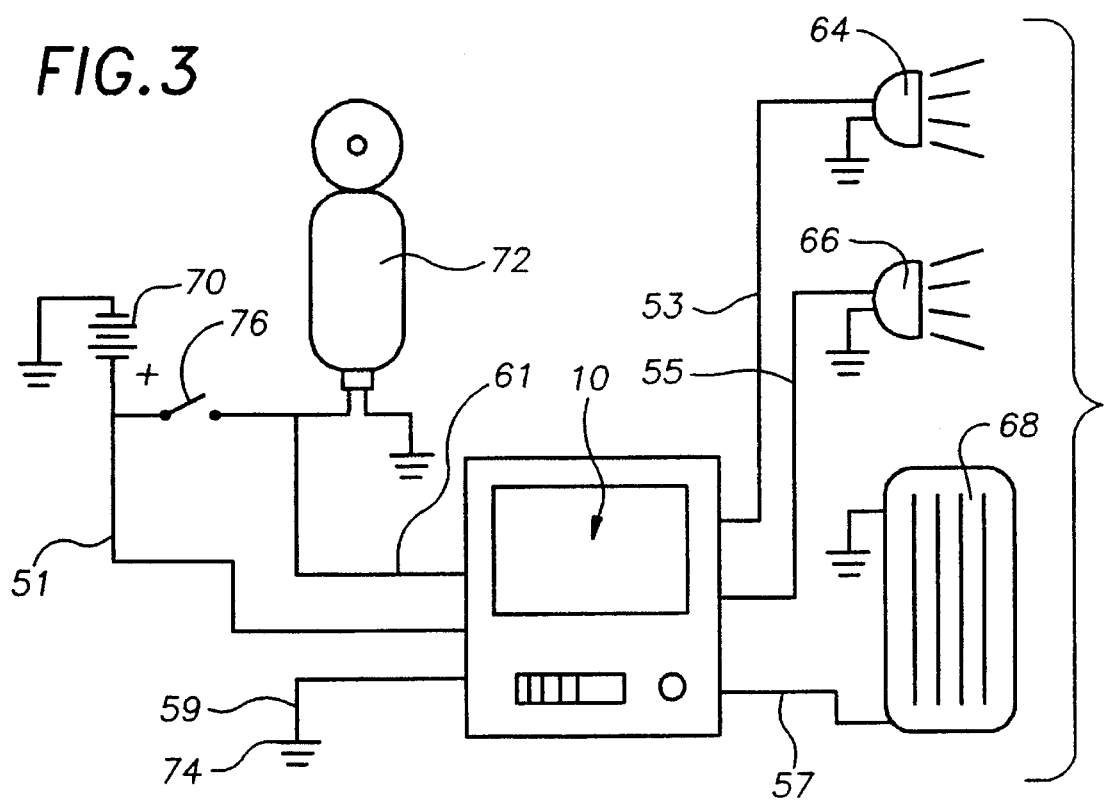
FIG. 3 is a schematic view of the safety device of FIG. 1 showing interconnection of the safety device with the devices of the automobile.

With reference to FIG. 3, installation of safety device 10 is accomplished by connecting a jack end of left headlight insulated conductor wire 53 to the positive input of left headlight 64; connecting the jack end of right headlight insulated conductor wire 55 to the positive input of right headlight 66; connecting the jack end of defogger insulated conductor wire 57 to the positive input of rear window defogger 68; connecting the jack end of twelve volt supply insulated conductor wire 51 to the positive terminal of automobile battery 70; connecting the jack end of wiper motor supply insulated conductor wire 61 to the positive terminal of a windshield wiper motor 72; and connecting the jack end of ground insulated conductor wire 59 to the automobile ground 74.

Operation of safety device 10 is simple. When the automobile windshield wipers are activated, by flipping a switch 76 a high voltage is placed on activation input 60. A high voltage on activation input 60 cause coil 50 to become energized and thereby closing first, second and third contact pairs 44, 46, 48. Closing first, second and third contact pairs 44, 46, 48 energize left headlight 64, right headlight 66 and rear wind defogger 68. Use of a time delay circuit 56 allows safety device 10 to operate properly even when the intermittent setting on the windshield wiper control is selected. When a low voltage is placed on activation input 60, time delay circuit 56 waits forty-five seconds and then de-energizes coil 50 allowing first, second, and third contact pairs 44, 46, 48 to open. When first, second, and third contact pairs 44, 46, 48 are open, left and right headlights 64, 66 and rear window defogger 68 are turned off.

It can be seen from the preceding description that an automobile safety device has been provided that automatically activates the rear window defogger when rainy conditions are present, and that automatically activates the automobiles headlight system when rainy conditions are present.

It is noted that the embodiment of the automobile safety device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An automobile safety device comprising:
    a housing forming an internal circuit chamber and having a first outer surface, said outer surface including a section of adhesive foam secured thereover, said adhesive foam having a peel away cover member disposed thereover in a manner to allow removal of said peel away cover member and securement of said housing to a substantially flat surface with said adhesive foam;
    a relay switch, disposed within said circuit chamber of said housing, having a first, second and third pair of normally open electrical contacts actuated by a first coil having a coil input connection and a coil output connection, each said pair of electrical contacts having a supply side connection and a device side connection;
    a time delay circuit having an active output wired to said coil input connection that provides an electrical current to said first coil for a predetermined period of time exceeding detection of an absence of an activation signal at an activation input thereof;
    a wiring harness including an electrical connector having:
    a left headlight connection member,
    a right headlight connection member,
    a defogger connection member,
    a twelve volt supply connection member,
    a wiper motor supply connection member, and
    a ground connection member,
    each said connection member being wired, respectively, to a first end of a left headlight insulated conductor wire, a first end of a right headlight insulated conductor wire, a first end of a defogger insulated conductor wire, a first end of a twelve volt supply insulated conductor wire, a first end of a wiper motor supply insulated conductor wire, and a first end of a ground insulated conductor wire;
    a second end of said left headlight insulated conductor wire is wired to said device side connection of said first pair of electrical contacts, a second end of said right headlight insulated conductor wire is wired to said device side connection of said second pair of electrical connects, a second end of said defogger insulated conductor wire is wired to said device side connection of said third pair of electrical contacts, a second end of said twelve volt supply insulated conductor wire is wired to said supply side connection of said first, second and third pairs of electrical contacts, a second end of said wiper motor supply insulated conductor wire is wired to said activation input of said time delay circuit, and a second end of said ground insulated conductor wire is wired to said coil output connection.

2. The automobile safety device of claim 1, wherein:
    said safety device has aft one/off switch and said time delay circuit further includes an indicator lamp that extends outwardly from said housing and that is wired into said time delay circuit in a manner such that said indicator lamp is illuminated when said safety device is on.

* * * * *